United States Patent
Pratt

[11] 3,753,591
[45] Aug. 21, 1973

[54] FLAT BED MATERIAL TRANSPORTING VEHICLE

[75] Inventor: Robert A. Pratt, Oak Brook, Ill.
[73] Assignee: Portec, Inc., Oak Brook, Ill.
[22] Filed: Feb. 8, 1972
[21] Appl. No.: 224,428

Related U.S. Application Data
[63] Continuation of Ser. No. 874,105, Nov. 5, 1969, abandoned.

[52] U.S. Cl. ....... 296/35 A, 105/366 B, 105/366 C, 248/361
[51] Int. Cl............................ B60p 1/64, B65j 1/22
[58] Field of Search............... 296/35 A; 105/366 R, 105/366 C, 366 D, 366 B, 367, 368 R, 368 T, 369 A; 280/DIG. 8; 220/23.4; 248/361, 119; 24/81 E

[56] References Cited
UNITED STATES PATENTS

| | | | |
|---|---|---|---|
| 3,315,617 | 4/1967 | Schwiebert et al. | 105/368 T |
| 3,288,411 | 11/1966 | Davidson | 248/119 R |
| 1,922,632 | 8/1933 | Owens | 105/366 D |
| 3,188,042 | 6/1965 | Watters | 248/361 |
| 3,219,218 | 11/1965 | Hand | 296/35 A |
| 3,389,664 | 6/1968 | Pulcrano et al. | 105/366 D |
| 3,417,712 | 12/1968 | Pulcrano et al. | 105/366 D |
| 3,442,224 | 5/1969 | Rutkoski | 105/368 T |

Primary Examiner—Benjamin Hersh
Assistant Examiner—John A. Pekar
Attorney—Benjamin H. Sherman, Donald J. Simpson et al.

[57] ABSTRACT

Flat bed transporting vehicle for containers, farm and road machinery and other vehicles and lading, having a series of anchor channels extending along the vehicle for the length of the vehicle and unitized with the frame structure of the vehicle to form a unitary part of the chassis frame supporting beams, in which couplers for containers or tie-downs for anchor chains or tie-downs winches may be locked in a selected position in the channels and stored in the channels when not in use. Where the vehicle is used for transporting containers, the couplers are positionable above the level of the channels and bed of the vehicle, to couple adjacent ends of containers to the bed of the vehicle, and are locked in extended positions by retaining sockets at the corners of the containers and are released to be retracted beneath the tops of the channels for storage or adjustment along the channels upon removal of the containers from the couplers.

11 Claims, 11 Drawing Figures

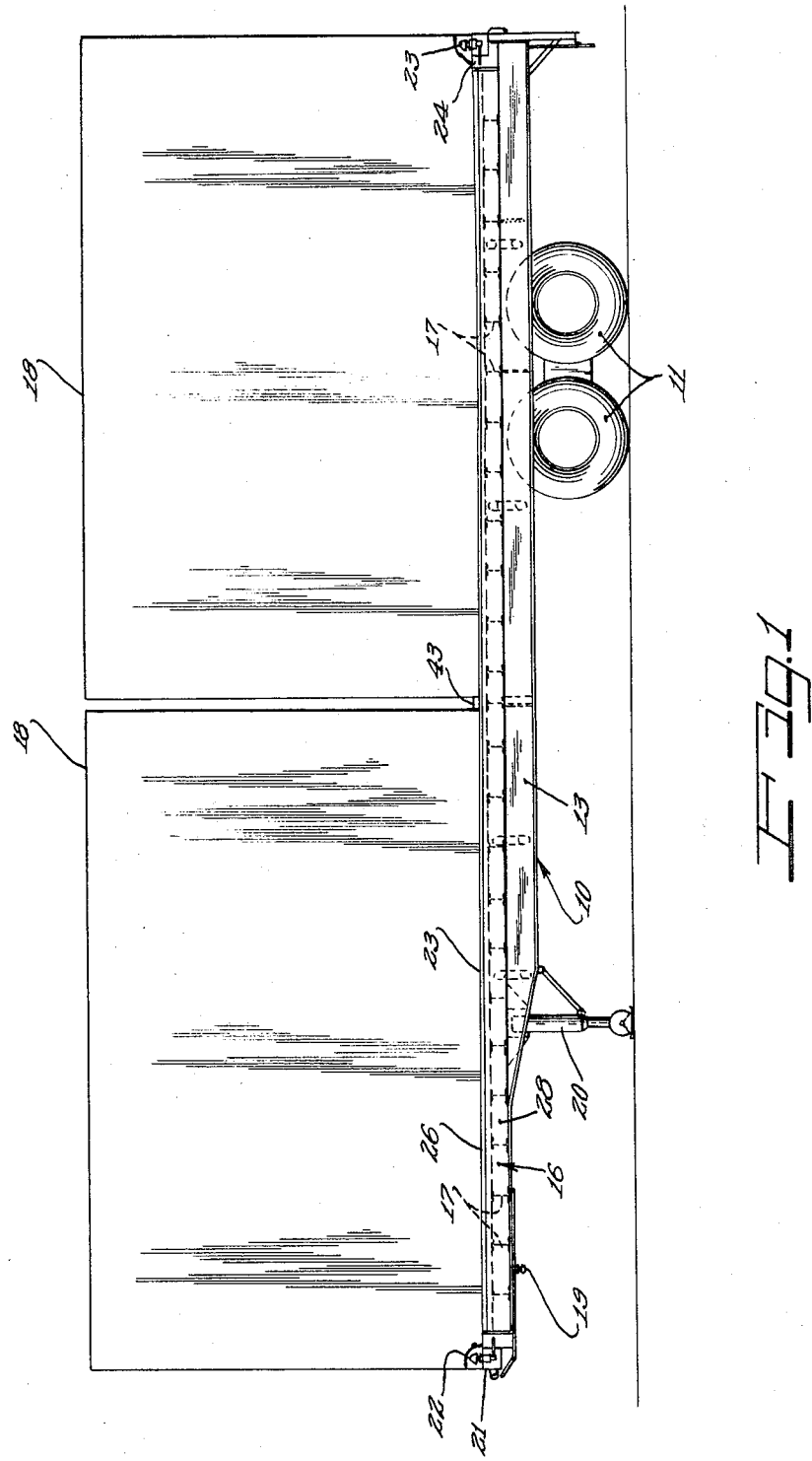

Patented Aug. 21, 1973
3,753,591
5 Sheets-Sheet 2
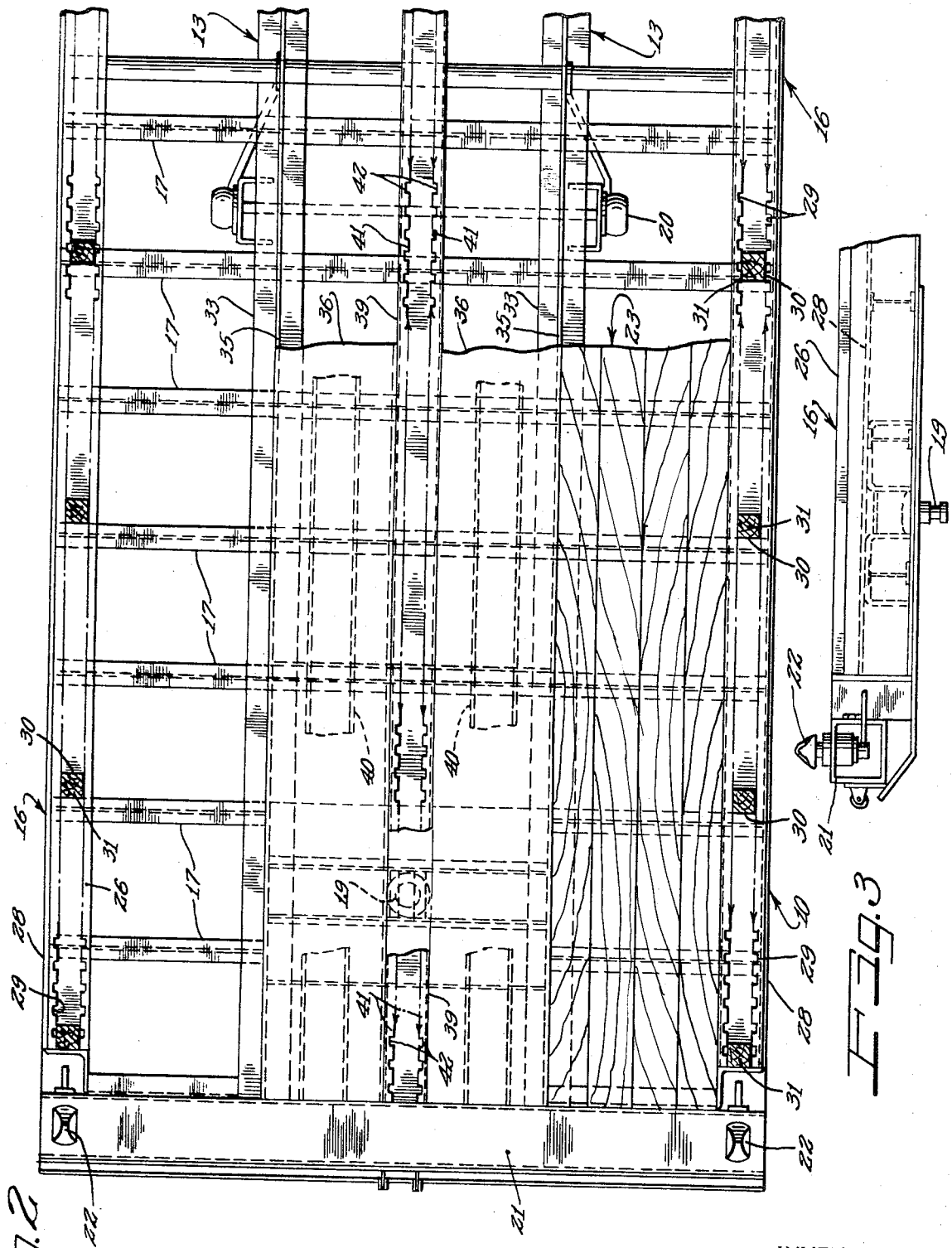
INVENTOR.
Robert A. Pratt
BY
ATTORNEYS

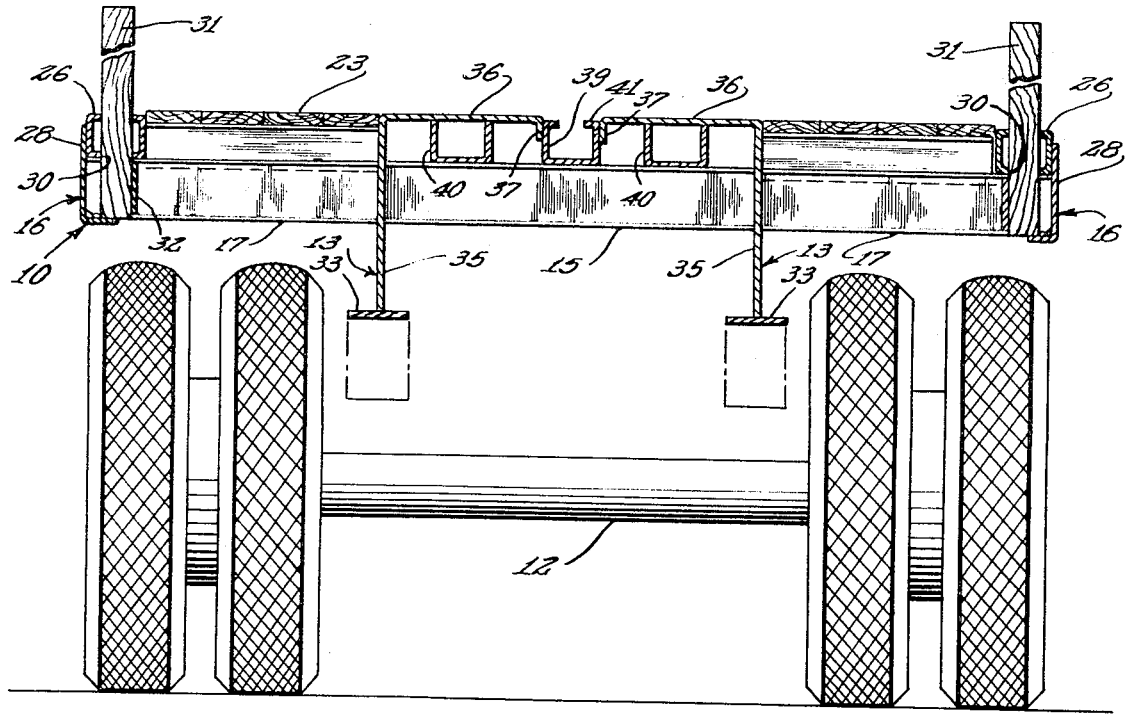
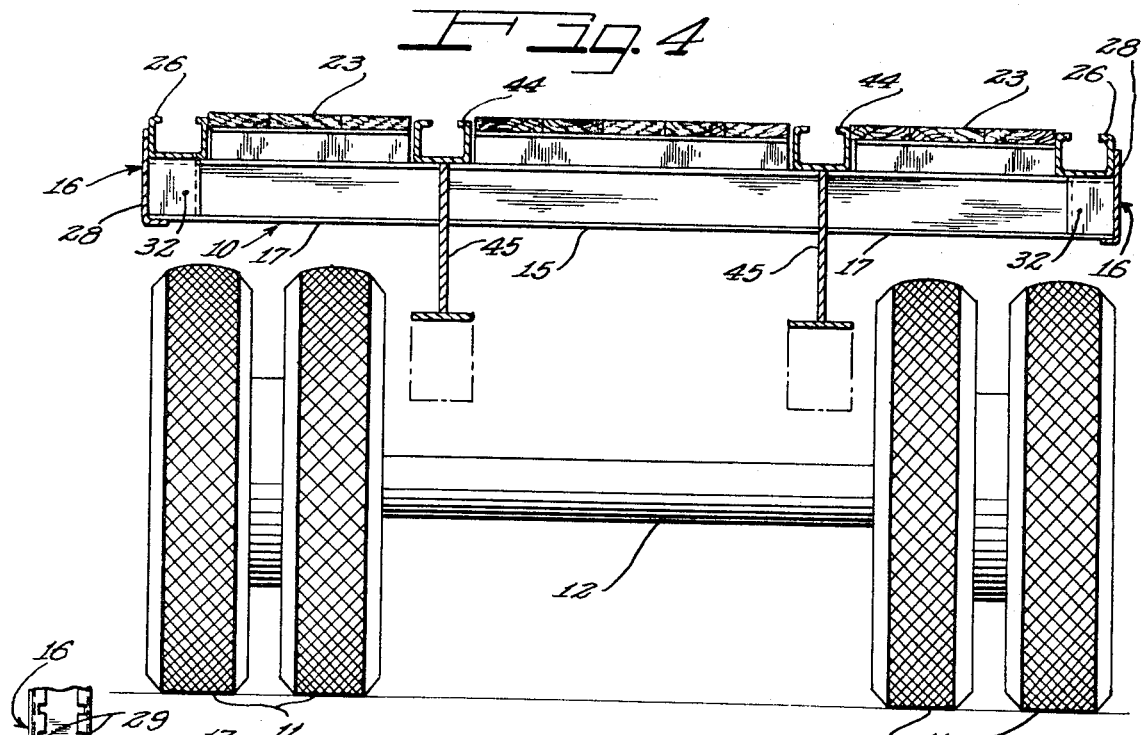
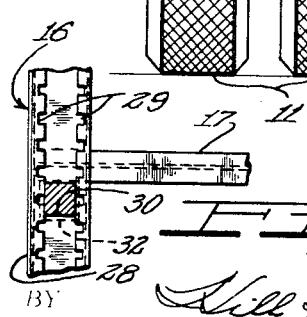
INVENTOR.
Robert A. Pratt

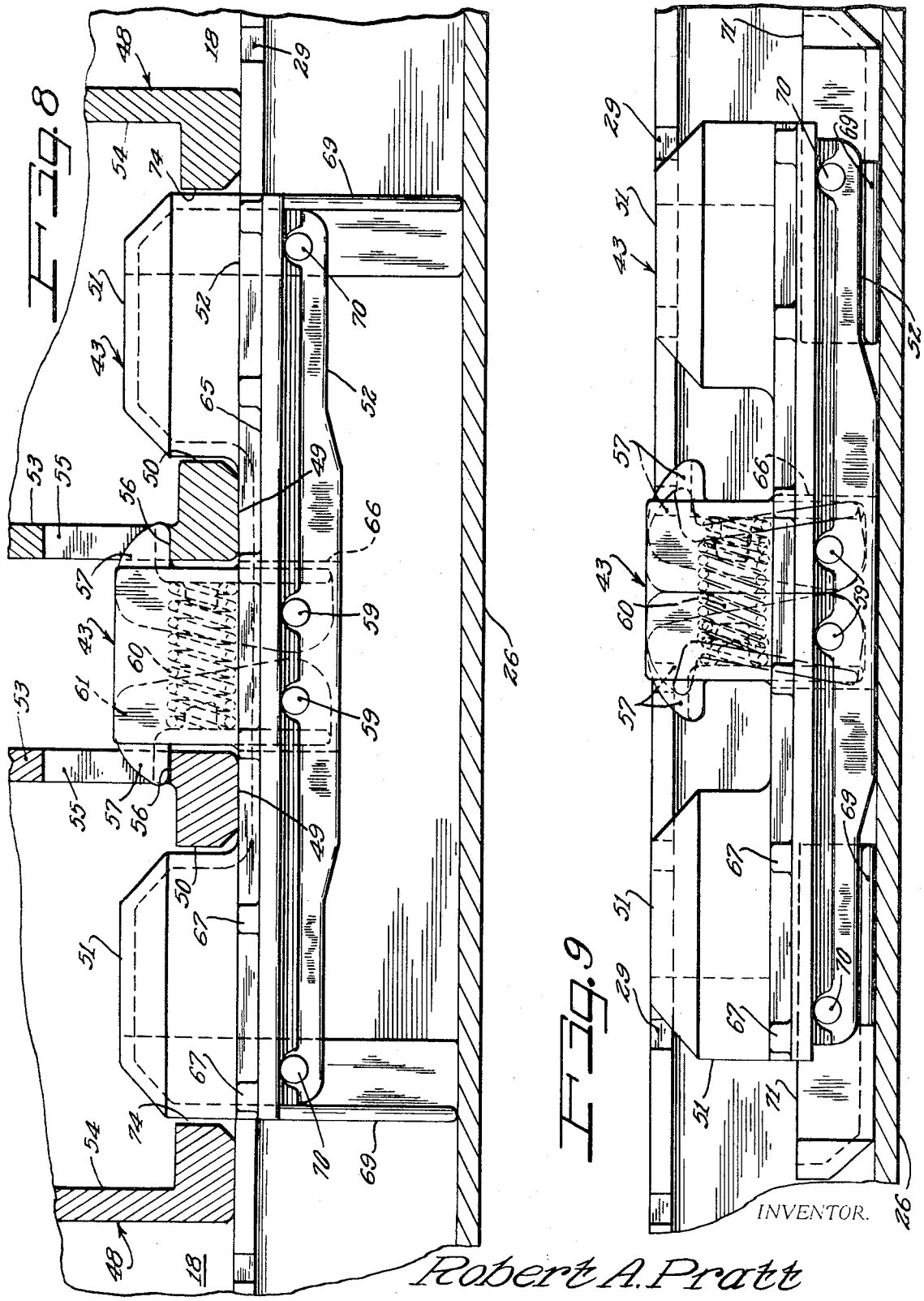

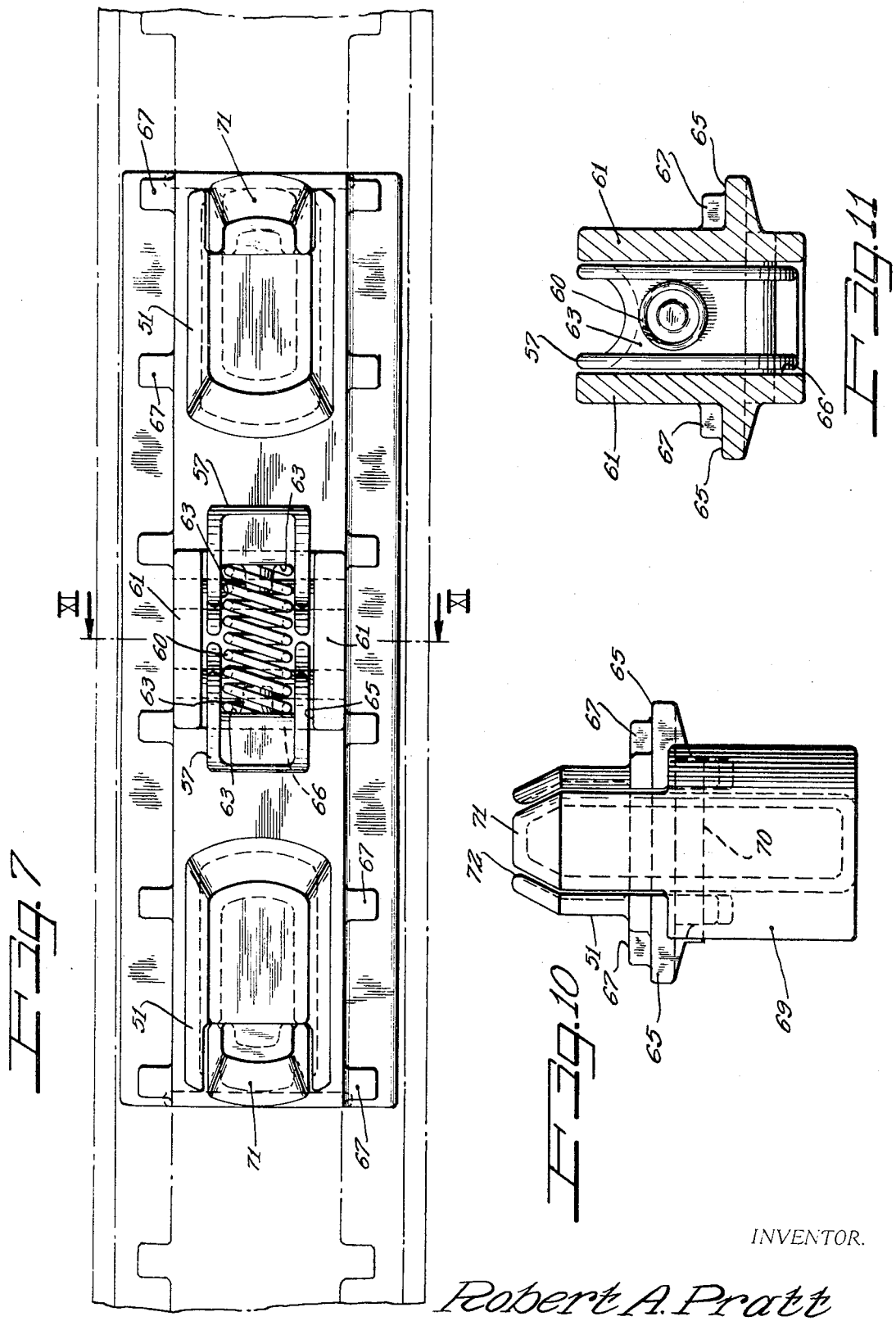

FLAT BED MATERIAL TRANSPORTING VEHICLE

This application is a continuation of my application Ser. No. 874,105, filed Nov. 5, 1969, and now abandoned.

SUMMARY AND OBJECTS OF INVENTION

Improved form of flat bed transporting vehicle in the form of a trailer or railway car, in which anchoring channels extend for substantially the length of the vehicle and are adpated to lock chain anchors or winches or couplers for containers in position on the deck of the vehicle, and are an integral part of the chassis frame supporting members, and provide an even distribution of the dynamic and static bending loads of the chassis supporting members of the vehicle and also provide a continuous load securement system for the length of the vehicle.

A principal object of the present invention is to provide an improved form of flat bed trailer and the like, in which anchoring channels extend for the length of the trailer and open at floor level and form an integral part of the chassis frame supporting members.

Another object of the invention is to provide a more rugged flat bed trailer than formerly in which anchoring channels form a continuous load securement system for the length of the trailer, and are unitized with the frame supporting members of the trailer to cooperate therewith and more evenly distribute the bending loads on the trailer.

A further object of the invention is to provide a flat bed trailer and the like in which couplers or tie-downs may be adjustably moved along anchor channels opening on a level with the floor of the vehicle and are carried by the anchor channels for adjustable movement therealong and are held in fixed relation relative to the channels as extended above the deck of the vehicle into coupling or tie-down positions.

A still further object of the invention is to provide a simple and improved form of flat bed trailer having container couplers guided for movement along the vehicle for the length thereof, to be positioned at selective positions along the length of the vehicle depending upon the length of the container to be coupled, and in which the supporting and guide means for the couplers form an integral part of the frame supporting members of the vehicle chassis.

A further object of the invention is to provide a flat bed trailer in which the container couplers are adapted to couple a pair of containers to the deck of the trailer in end-to-end relation relative to each other and are locked in operative extended positions relative to the deck of the vehicle by the containers as coupled thereto, and can readily be moved to inoperable retracted positions beneath the deck of the trailer as the containers are removed therefrom, to accommodate the trailer to carry heavy machinery or other lading, in which the guide and retaining members for the couplers also serve as storage area for tie-down chains and anchor assemblies beneath the deck of the vehicle.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a view in side elevation of a flat bed trailer constructed in accordance with the principles of the present invention showing the trailer with two containers coupled thereto in end-to-end relation, with certain parts broken away in order to show the end locking means for the containers.

FIG. 2 is a fragmentary plan view of the front end portion of the trailer shown in FIG. 1, with certain parts broken away and certain other parts shown in section, in order to illustrate certain details of the present inventon.

FIG. 3 is an enlarged fragmentary side view of the front end portion of the vehicle frame, showing a container lock at the front of the frame, and a kingpin depending from the frame.

FIG. 4 is a transverse sectional view of the vehicle shown in FIGS. 1 and 2 taken through the spring suspension end of the vehicle.

FIG. 5 is an enlarged detail partial fragmentary plan view illustrating certain details of an anchor channel and stake pocket opening.

FIG. 6 is a transverse sectional view of a modified form of vehicle, showing four anchor channels extending for the length of the vehicle and forming an integral part of the chassis frame supporting members.

FIG. 7 is a partial fragmentary top plan view of one of the side rails of the vehicle, showing a container coupler extending from one of the anchor channels of the vehicle, and showing the anchor channel for the coupler in broken lines.

FIG. 8 is a longitudinal sectional view showing a part of an anchor channel in longitudinal section, and showing a container coupler in extended relation relative to the channel, and having coupling engagement with two containers in end-to-end relation with respect to each other.

FIG. 9 is a view somewhat similar to FIG. 8 but showing the container coupler retracted in the anchor channel beneath the deck of the vehicle.

FIG. 10 is an end view of the container coupler in its extended position; and

FIG. 11 is a fragmentary transverse sectional view taken through the coupler, substantially along line XI—XI of FIG. 7.

DESCRIPTION OF PREFERRED EMBODIMENTS OF INVENTION

In FIGS. 1, 2 and 3 of the drawings, I have shown a flat bed trailer including an elongated chassis frame 10 supported on rear wheels 11 and axles 12. The chassis frame 10 includes parallel spaced main side frame members 13, 13 spaced apart by cross members 15, forming the center sill of the chassis, and outer side rails 16, 16 spaced outwardly of the main side frame members by parallel spaced cross frame members 17, 17.

The main frame 10 has a kingpin assembly 19, adjacent the forward end thereof, to be supported on the fifth wheel of a tractor (not shown) when hauling a trailer from place to place, or to be supported on a fifth wheel support on a flat car, when it is desired to transport the entire trailer on a railway flat car. A retractable stand and wheel assembly 20 is disposed adjacent the forward end of the main frame 10 for supporting the main chassis frame in a position generally parallel with the ground, for the loading of containers 18 thereon.

The main frame also has a front stationary beam 21 in the form of a bolster extending across the front of the frame and having container locks 22 having generally conical locking heads for engagement within corner fitting sockets (not shown) in the corners of a container 18 for locking the container to a flat bed or floor 23 of the trailer.

A rear bolster 24 (FIG. 1) extends across the rear end of the chassis frame 10 transversely of and along the tops of the main side frame members 13, and has container locks 25 extending upwardly therefrom like the container locks 22. The container locks 22 and 25 may be of a conventional form and are turnable by a handle from beneath the floor of the trailer to be moved into locked or released positions to retain the container to the floor of the trailer. The locks 22 and 25 may also be retracted downwardly beneath floor level in a suitable manner, to be free from the floor of the trailer when desired. Said container locks form no part of the present invention except insofar as they lock the opposite corners of a container or containers to the floor of the trailer so need not herein be shown or described further.

The side rails or sills 16 are in the form of anchor channels 26, 26 extending for the length thereof and having rub plates 28 extending along the outer sides thereof and downwardly therefrom beneath the lower flanges of the cross frame members 17 and welded or otherwise secured thereto. The bottoms of the anchor channels 26 may also be welded or otherwise secured to the top flanges of the cross frame members 17 to cooperate with said cross frame members and rub rails, to provide a unitized anchor channel and side rail assembly for the trailer and to form a part of the supporting framework and bracing structure for the trailer.

As shown in FIGS. 2, 3 and 5, the anchor channels 26 have inwardly facing retainer flanges at floor level having uniformly spaced locking notches 29 formed therein and extending for the length thereof. The channels 26 have a series of spaced stake pocket openings 30 leading through the webs thereof and spaced therealong at intervals, to detachably receive stakes 31 where it is desired to use the trailer as a stake trailer to transport certain loads. The stake pocket openings are placed to one side of the cross frame members 17 and may be closed by suitable closure members 32, generally U-shaped in form and extending about said openings to aid in retaining the stakes in position in said stake pocket openings.

The main side frame members 13, 13 are shown in the cross sectional view in FIG. 4 as being in the form of inverted L-beams having bottom flanges 33, which may be mounted on the spring seats for the trailer in any suitable manner. The flanges 33 have upright webs 35 extending upwardly therefrom to the level of the floor 23 and then turning inwardly at right angles to form a part of the composite floor of the vehicle as indicated by reference character 36. The inner end portions of the floor portions 36 of the beams or main side frame members 13 are downwardly turned, as indicated by reference character 37, and are welded or otherwise secured to opposite sides of a central anchor channel 39, extending for the length of the vehicle frame. The down-turned portions or flanges 37 are welded or otherwise secured to the opposite legs of the anchor channel 39 to form a composite beam and floor structure extending along the center of the trailer. The base of the channel 39 is supported on the top of the cross frame members 15 and may be welded thereto. Reinforcing channels 40 extend along the bottom of the floor portions 36 of the main side frame members 13 and are supported on the cross frame members 15 on their webs and have upright legs welded or otherwise secured to the bottoms of the inwardly extending floor portions 36 of the main side frame members 13.

The anchor channel 39 and main side frame members 13 spaced apart by the cross frame members 15 and reinforced by the channels 40, 40 supported on said cross frame members 15 are thus an integral part of the center sill of the chassis and provide an even distribution of the dynamic and static bending loads to the chassis supporting structure, and provide a unitized anchor channel and center sill for the trailer chassis cooperating with the unitized side rails formed by the anchor channels 26 and rub or side rails 16 spaced from the main side frame members 13 by the cross frame members 17 and supported thereon.

The anchor channel 39 has facing flanges 41 having inwardly opening notches 42 therein uniformly spaced throughout the length of said channels and affording a means for releasably locking a tie-down winch (not shown) or other chain locking device or coupler in position on the floor of the trailer, as will hereinafter more clearly appear as this specification proceeds.

FIG. 6 of the drawings shows a modified form of my invention in which four anchor channels extend the length of the vehicle. In this form of the invention anchor channels 44 replace the top flanges of I-beams 45 forming the main side frame members of the center sill of the trailer, and form an integral part of said main side frame members. The trailer construction is otherwise similar to that of FIGS. 1 to 4, so a detailed description of the trailer need not be repeated and the same part numbers will be applied to the same parts as were applied in FIGS. 1, 2 and 4. In this form of trailer, the two inner anchor channels are an integral part of the chassis frame and center sill and the two outer anchor channels 26 together with the side rails 16 replace the rub rails of a standard trailer and are an integral part of the chassis frame.

It should here be understood that the containers 18 are lifted from storage or from another container transporting device and lowered onto the flat deck of the transporting vehicle by the forks of a tong-type lifting apparatus or by a derrick and harness or like apparatus and are located on the vehicle as lowered to be supported on the vehicle in a conventional manner, as shown and described in U.S. Pat. No. 2,812,974 which issued to H. J. McHugh on Nov. 12, 1957 and in U.S. Pat. No. 3,014,604 which issued to J. E. Loomis on Dec. 26, 1961. The lifting and lowering mechanism, therefore, is conventional and no part of the present invention so need not herein be shown or described further.

In FIG. 1 of the drawings, two containers 18 are shown as supported on the floor of the trailer and in the outer channels 26 coupled in end-to-end relation with respect thereto by couplers 43. The containers 18 are locked at their corners opposite the couplers 43 by the locks 22 and 25 engaging corner fitting sockets at the corners of the containers. The corner fitting sockets are designated by reference numeral 48 in FIG. 8 and sockets like the sockets shown in cross section in FIG. 8 are provided at each corner of the container. Each socket 48 includes a bottom wall 49 having an opening 50 therein, generally conforming to the base of an upstanding guide and retainer 51 extending upwardly of a base 52 of the container coupler 43. The fittings or sockets 48 also have a front wall 53 and an inwardly spaced inner wall 54.

An opening 55 opens through the front wall 53 of each corner fitting and has a bottom surface 56 forming a strike surface, engaged by the downwardly facing face of a latch 57 transversely pivoted at its lower end to the base 52 for the coupling member on a transverse pivot pin 59. The next adjacent socket 48 on the end of the next adjacent container is formed exactly like the socket just described so the same reference numerals will be applied to each socket and a description of the socket need not be repeated.

The bottom wall or strike surface 56 of the next adjacent socket is engaged by the downwardly facing latch surface of a latch 57, facing oppositely from the first mentioned latch, as the container is lowered onto the flat deck of the trailer, and guided into place by the upstanding guide and retainer 51. A spring 60 is disposed between spacer walls 61 extending upwardly of the base or main frame 49 along opposite sides of the latches 57, and is seated at its opposite ends within recessed portions 63 in the inner faces of the latches 57. Said spring biases the latches outwardly relative to the spacer walls 61, 61 into latching positions, as shown in FIGS. 7 and 8 and accommodates release of the latches by upward lifting movement of the container. The latches 57, 57 extend downwardly beneath flanges 65, 65 extending laterally of and along opposite sides of the base 49 in an open portion 66 of said base. The open portion 66 is centrally located relative to said base and the latches 57, 57 and the front and rear walls of said open portion limit outward movement of said latches relative to the guide and spacer walls 61, to accommodate containers to be lowered along opposite sides of the spacer walls 61, 61, with the openings 50, 50 in the bottom of the container, registering with the guides 51, 51 and guided in position by the guides 51, 51, to cam the latches 57, 57 inwardly and then accommodate said latches to come into engagement with the strike surfaces 56, 56 by the bias of the spring 60, and retain the containers in coupled relation relative to each other on the flat deck of the trailer. The flanges 65 have upwardly extending lugs 67 spaced therealong for engagement with the notches 29 in the facing flanges of the anchor channels 26, 26.

The container coupler is supported in its operative extended position, to extend above the top of the anchor channel 26 on collapsible legs 69, pivoted to the base 52 adjacent opposite ends thereof on parallel transverse pivot pins 70. The collapsible legs 69 have projecting end portions 71 extending beyond opposite ends of the base 52 when the container coupler is in its retracted position (FIG. 9), and fitting within recesses 72 formed in the guides and retainers 51, and generally conforming to the form thereof when the legs 69 are in their upright coupler supporting positions shown in FIG. 8. When in this position, inner walls 74 of the sockets 50 of the adjacent corner fittings 48, hold the legs 69 in their upright positions, and thereby maintain the legs 69 in position to hold the lugs 67 into locking engagement with the anchor channel notches 29 and prevent release of the container coupler as long as the container is coupled thereto. As the containers are removed from the couplers, and it is desired to retract the couplers to accommodate the loading of other material on the trailer or to store the couplers in the anchor channels 26, it is merely necessary to strike the legs 69 inwardly by the blow of a hammer. The coupler will then collapse below floor level.

When it is desired to remove the containers 18 from the trailer, it is merely necessary to first release the locks 22 and 25 and then individually lift the containers from the trailer by the forks of a fork lift or by any other lifting device, to accommodate the strike surfaces 56 to cam the latches 57 against the springs 60 into released positions. The containers can then be freely lifted from the deck of the trailer.

The release of the latch 57 against the force of the spring 60, upon upward lifting movement of the container is attained by the lifting force exerted by the strike surface 56 on the downwardly facing latch surface of the latch 57 located in inwardly spaced relation with respect to the axis of the pivot pin 59. The lever arm between the axis of the pivot pin 59 and the line of engagement of the strike surface 56 with the downwardly facing latching surface of the latch 57 is, therefore, such that as the lifting force on the container and strike surface 56 becomes greater than the force of the spring 60, the latch 57, which is shown as the left hand latch in FIGS. 8 and 9 will pivot in a clockwise direction by the camming action of the strike surface on the latch. The right hand latch, of course, will pivot in a counterclockwise direction.

It should here be understood that the downwardly facing latching surfaces of the latches 57 are flat, to firmly engage the strike surfaces 56 and retain the container to the vehicle during transportation of the container, and only tilt when the upward lifting force exerted by the strike surfaces 56 overcomes the force of the spring 60.

While only two containers 18 are shown as coupled to the floor of the trailer, it should be understood that additional couplers 43 may be provided in the anchor channels where necessary and accommodate four ten foot containers and two ten foot containers to be coupled to the deck of the trailer. Where only one container is coupled to the flat deck of the trailer, the couplers 43 are stored by collapsing the legs 69 with the blow of a hammer or other tool, to retract the legs about the pivot pins 70, and accommodate the coupler to drop to the base of the channel.

It should be understood that while a trailer is shown in the drawings and the description is directed to the trailer shown, that the principles of the present invention may be applied as well to a railway flat car or to any other material transporting device requiring an anchoring means for a load.

It should further be understood that while the trailer has been described herein for coupling containers to its flat deck and the couplers 43 are shown, which may be stored beneath the deck in the anchor channels when not in use, that the anchor channels may be used as anchoring members for tie-down winches or other tie-down devices and provide a storage area for the chains and tie-down assemblies beneath the deck of the trailer.

I claim as my invention:

1. In a flat bed vehicle, particularly adapted for transporting heavy lading,
   a vehicle frame having a floor,
   a pair of parallel spaced longitudinally extending beams extending for substantially the length of said vehicle frame,
   cross members spacing said beams apart and unitized thereto to form the center sill of the vehicle,
   wheels and axles supporting said beams above ground level,
   side rails extending parallel to said beams along opposite sides of the vehicle frame,
   anchor channels opening at floor level, unitized with said side rails and extending along the insides of said side rails and forming a part of the supporting structure of the vehicle frame,
   other cross members spacing said side rails and anchor channels from said beams and unitized to said side rails and anchor channels,
   said beams having portions flush with the vehicle floor and forming at least one unitized anchor channel opening at floor level and forming a part of the support structure of the vehicle frame,
   releasable container locks at opposite ends of the vehicle deck in alignment with the anchor channels unitized to the side rails, for locking the corners of containers to the vehicle deck, and
   container couplers carried in said anchor channels unitized to the side rails between said container locks and having latching members adapted to have latching engagement with downwardly opening sockets in the containers, support legs movably mounted on said couplers for movement into position to engage the bottoms of the anchor channels and support the container couplers and latching members above the deck of the vehicle into position to extend within the container sockets and couple the containers to the vehicle floor, and having end portions extending upwardly within the container sockets and locked in position by the container sockets, said legs being held in their support positions in engagement with the bottoms of the channels by engagement of said end portions with the container sockets, and being retractable to accommodate said legs and container couplers to be retracted within said channels only when the containers are removed from the couplers to release said end portions and legs to move into their retracted positions.

2. In a flat bed vehicle adapted to transport containers and in combination with a container having at least one downwardly opening retaining socket at a corner thereof and opening to the bottom thereof and having a strike surface at the end of the socket,
   a vehicle frame including a flat deck,
   side rails extending along opposite sides of said deck including anchor channels opening at deck level and having a base having parallel side walls extending upwardly from said base and retainer flanges extending inwardly of said sidewalls,
   at least one container coupler in each anchor channel and having a base movable along the base of an associated anchor channel and movable vertically into position to be supported to extend upwardly into locking engagement with the retainer flanges of an associated channel and position said container coupler to engage a retainer socket and lock a container to the deck, and movable downwardly within said channel beneath the level of the deck, for adjustable movement along the associated channel,
   a latch on said coupler base for engaging said strike surface when said base is in locking engagement with said channel,
   support means releasably supporting said coupler base and container coupler in locking engagement with said channel,
   said support means being engaged by said container socket and locked by said container socket in position to support said coupler in an elevated position, as a container is lowered thereon.

3. The flat bed vehicle of claim 2,
   wherein the base has at least one guide and spacer wall extending upwardly of said base along an end of a container, and
   wherein the latch is biased to extend from an end of said guide and spacer wall to have latching engagement with said strike surface, as a container is lowered onto said coupler.

4. The flat bed vehicle of claim 3,
   wherein the container coupler has an upstanding guide and retainer spaced along said base from said guide and spacer wall,
   wherein the downwardly opening retaining socket is registrable with said upstanding guide and retainer upon lowering movement of the container, and guides the container in position to be coupled to the vehicle deck by said latch, and
   wherein spring means bias said latch into engagement with said strike surface.

5. The flat bed vehicle of claim 4,
   wherein the base has at least one retractable leg transversely pivoted thereto and forming the support means therefor,
   wherein said upstanding guide and retainer has a recessed portion therein extending upwardly therealong and opening to the outer end thereof,
   wherein said retractable leg has a portion extending from the pivot thereof within said recessed portion upon the positioning of said leg to support the coupler to extend above deck level, and
   wherein the container socket as engaging said upstanding guide and retainer extends along said upwardly extending portion of said leg and locks said leg in position to hold the coupler above the level of said deck to couple a container thereto, as long as said guide abutment is engageable with said socket.

6. In a flat bed vehicle adapted to support and transport containers of various lengths and in combination with a pair of containers having downwardly opening retaining sockets at each corner thereof and opening to the bottom thereof and having a latching and strike surface at the end of each socket, opening to the end of the socket,
   a vehicle frame including a flat deck,
   side rails extending along opposite sides of said deck including anchor channels opening at deck level,
   said anchor channels each including a base, side walls extending upwardly from said base and retainer flanges extending inwardly from said side walls and having locking notches spaced therealong,
   at least one container coupler in each anchor channel and including a base having locking lugs spaced therealong, said base being movable vertically into position to move said lugs into locking engagement with the locking notches of an associated channel, each coupler having retractable support legs movably mounted thereon to support said base in locking engagement with said retainer flanges of an associated channel and lock the adjacent ends of a pair of containers to the deck, said legs being releasable upon removal of a coupler therefrom to move downwardly within said channel beneath the level of the deck, for adjustable movement along the associated channel, said container couplers each having laterally aligned spacer walls extending upwardly of said base longitudinally of the vehicle for engagement with downwardly opening retainer sockets in a container, and a pair of oppositely facing latches movably mounted between said spacer walls and biased to extend from opposite ends of said spacer walls to come into locking engagement with the latching and strike surfaces at the ends of adjacent ends of a pair of containers to lock the containers to said couplers as lowered thereonto.

7. The flat bed vehicle of claim 6, wherein spring means, seated on said latches, bias said latches outwardly relative to said guide and spacer walls to accommodate downward movement of the containers as lowered onto the deck of the vehicle to cam said latches into retracted positions to come into locking engagement with said strike surfaces of said socket members as the container is lowered to rest on the deck of the vehicle.

8. The flat bed vehicle of claim 7,
wherein the container couplers have guide and retainers spaced from opposite ends of said spacer walls, and
wherein the container sockets have downwardly opening portions registrable with said guide and retainers upon lowering movement of the container, and guiding the container in position to be coupled to the vehicle deck by said latches.

9. The flat bed vehicle of claim 8,
wherein the retractable legs are transversely pivoted to said coupler base adjacent the opposite ends of each coupler,
wherein said retractable legs have portions extending from the pivots thereof upwardly along said guides and retainers upon the positioning of said legs to support the coupler to extend above deck level, and
wherein the container sockets as engaging said guide abutments extend along said upwardly extending portions of said legs and lock said legs in position to hold the couplers above the level of said deck to couple adjacent ends of two containers as long as said guide and retainers are engageable with said sockets.

10. The flat bed vehicle of claim 9, including container locks at opposite ends of said anchor channels adapted to engage within the container sockets at the ends of the containers adjacent the ends of the vehicle, and operable to lock the containers to the flat deck of the vehicle upon lowering movement of the containers to register the downwardly opening container sockets with said container locks.

11. In a flat bed vehicle having anchor channels extending therealong having retainer flanges extending inwardly of the side walls thereof,
an automatic latching coupler carried in each anchor channel adapted to couple two corners of at least one container to the flat deck of a vehicle and in combination with a container having a downwardly opening socket at each corner thereof, each having a latching and strike surface opening to said socket from an end of said socket, each coupler including a base supported in said anchor channel for adjustable movement therealong and for vertical movement into engagement with said retainer flanges, means movably mounted on said base for supporting said base into engagement with said retainer flanges, at least one guide and spacer wall projecting upwardly of said base, and adapted to extend vertically along the end of a container, an upstanding guide and retainer spaced inwardly along said base from said spacer wall and in horizontal alignment therewith, and adapted to extend within said downwardly opening socket upon placing the container on the deck of a vehicle, a latch retractable with respect to said guide and spacer wall, a pivot for said latch pivoting said latch to said base in outwardly spaced relation with respect to the container about an axis spaced beneath said guide and spacer wall, said latch having a downwardly facing latching surface spaced above said base and conforming to said strike surface, and an opposite surface cammed by the container to retract said latch inwardly of said guide and spacer wall upon lowering movement of the container along said upstanding guide and retainer, a spring seated within the limits of said guide and spacer wall and biasing said latch to extend outwardly of said guide and spacer wall towards said upstanding guide and retainer, a container as lowered onto said coupler to register said downwardly opening socket with said upstanding guide and retainer, first engaging the top surface of said latch and retracting said latch within said guide and spacer wall, said latch then coming into latching engagement with said strike surface, to lock the container to the deck of the vehicle, the axis of the pivot for said latch and the point of engagement of said spring with said latch being spaced outwardly of said strike surface, and the relationship between the line of engagement of said strike surface with said latch, the pivot for said latch, and the point of engagement of said spring with said latch being such that upward lifting movement of the container will retract said latch with respect to said guide and spacer wall, and accommodate lifting of the container from the deck of the vehicle.

* * * * *